(12) United States Patent
Kang et al.

(10) Patent No.: US 7,760,455 B2
(45) Date of Patent: Jul. 20, 2010

(54) METHOD AND APPARATUS IMPROVING PREVENTION OF OFF-TRACK WRITING IN A HARD DISK DRIVE

(75) Inventors: Chang-Ik Kang, Fremont, CA (US); Bong-Jin Lee, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 566 days.

(21) Appl. No.: 11/788,450

(22) Filed: Apr. 19, 2007

(65) Prior Publication Data

US 2008/0259488 A1 Oct. 23, 2008

(51) Int. Cl.
*G11B 5/09* (2006.01)
(52) U.S. Cl. .................. 360/48; 360/31; 360/53; 360/60; 360/75; 360/77.04
(58) Field of Classification Search .......... 360/31, 360/48, 53, 75, 77.02, 77.04, 78.04, 77.08
See application file for complete search history.

(56) References Cited

U.S. PATENT DOCUMENTS

| | | | | |
|---|---|---|---|---|
| 5,771,131 A | * | 6/1998 | Pirzadeh | 360/77.08 |
| 5,828,516 A | * | 10/1998 | Park | 360/78.14 |
| 6,057,977 A | * | 5/2000 | Cunningham | 360/77.08 |
| 6,130,798 A | * | 10/2000 | Chang et al. | 360/77.05 |
| 6,181,493 B1 | * | 1/2001 | Wakefield | 360/31 |
| 6,215,608 B1 | * | 4/2001 | Serrano et al. | 360/60 |
| 6,327,112 B1 | * | 12/2001 | Ide et al. | 360/78.04 |
| 6,396,654 B2 | * | 5/2002 | Jeong et al. | 360/77.08 |
| 6,760,172 B1 | * | 7/2004 | Hamaguchi et al. | 360/48 |
| 6,768,609 B2 | * | 7/2004 | Heydt et al. | 360/77.08 |
| 6,937,420 B1 | * | 8/2005 | McNab et al. | 360/75 |
| 6,975,468 B1 | * | 12/2005 | Melrose et al. | 360/31 |
| 7,019,936 B2 | * | 3/2006 | Osafune et al. | 360/77.08 |
| 7,400,467 B1 | * | 7/2008 | Calihan et al. | 360/77.02 |
| 2002/0030920 A1 | * | 3/2002 | Min et al. | 360/77.04 |
| 2002/0036853 A1 | * | 3/2002 | Quak et al. | 360/31 |
| 2002/0131188 A1 | * | 9/2002 | Hamaguchi et al. | 360/31 |
| 2005/0152058 A1 | * | 7/2005 | Schmidt | 360/60 |

* cited by examiner

*Primary Examiner*—Dismery E Mercedes
(74) *Attorney, Agent, or Firm*—GSS Law Group

(57) ABSTRACT

Embodiments of the invention include: a hard disk drive using a read track to position for writing to a write track and generating a position error signal (PES) based upon all four servo offset bursts used to disable writing when the PES exceeds a position error threshold; a preamplifier generating the PES from four bursts from a slider reading the read track to position when the write track is to be written, and methods of writing the write track using PES from four bursts of the read track that disables writing when the PES is above the position error threshold.

11 Claims, 10 Drawing Sheets

— A Burst    - - - - B Burst    · · · · · C Burst    — · — D Burst

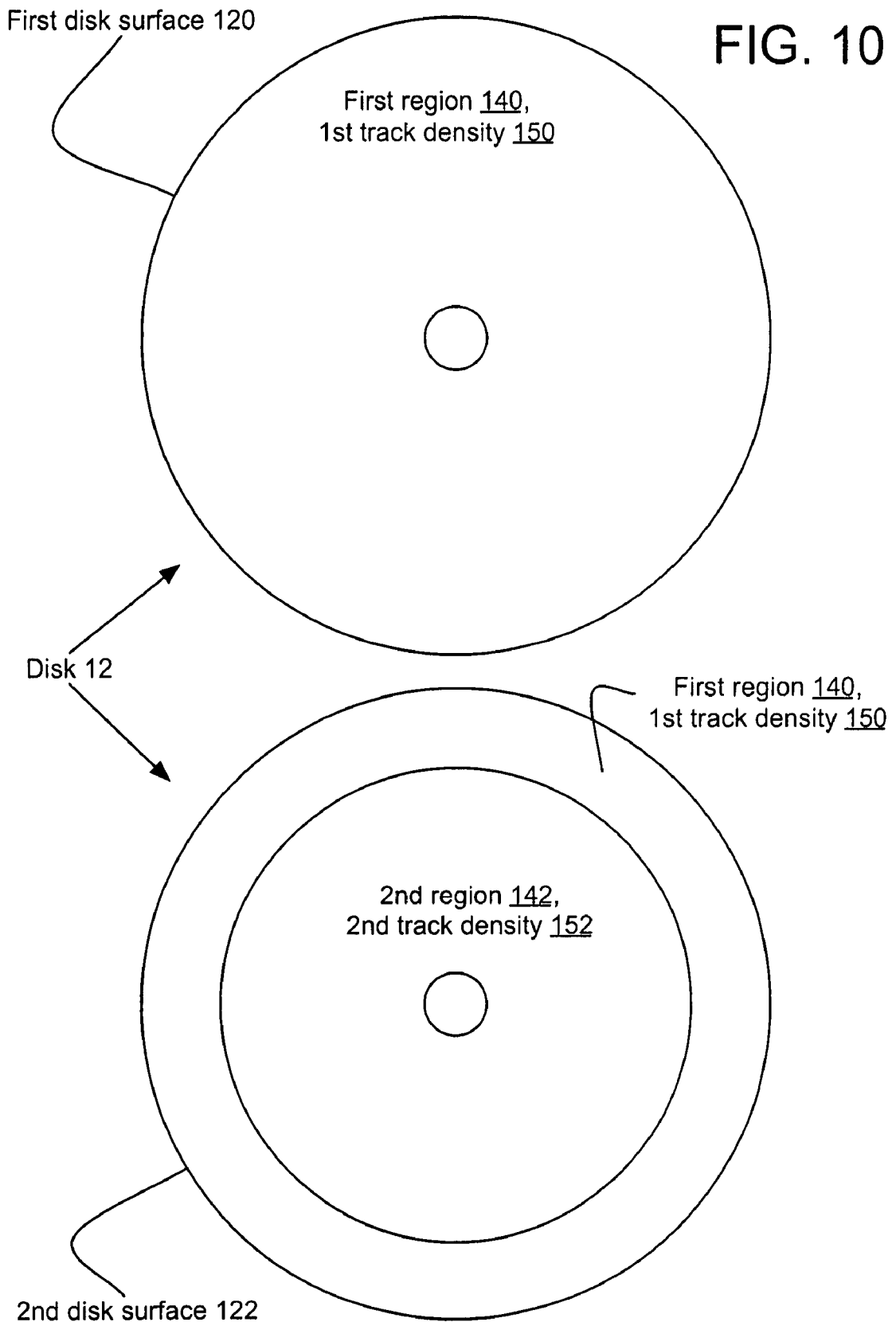

METHOD AND APPARATUS IMPROVING PREVENTION OF OFF-TRACK WRITING IN A HARD DISK DRIVE

TECHNICAL FIELD

This invention relates to writing tracks in a hard disk drive, and in particular to generating an improved Position Error Signal to improve the reliability of writing data.

BACKGROUND OF THE INVENTION

A contemporary hard disk drive includes at least one disk and accesses at least one of its two disk surfaces as the disk rotates at several thousand revolutions per minute. Typically, the data stored on the disk is organized in tracks, often arranged as concentric circles about the center of the disk.

Data access is usually performed through track read and track write operations. To perform either of these operations, a read-write head embedded flies in a slider a short distance off of the rotating disk surface, known as the flying height. The track pitch, or distance from the center of one data track to a neighboring track and the flying height may be less than ten nanometers. Positioning the read-write head to write a track is a significant technical challenge and has significant consequences on the overall quality and performance of the hard disk drive. Should the head be improperly positioned, it can damage the contents of a neighboring data track.

What is needed are ways to improve the reliability of writing data tracks by minimizing effects on neighboring data tracks.

Contemporary practice for writing a data track uses a position error signal based upon two of the four servo offset burst patterns, known as A burst, B burst, C burst, and D burst. Usually, the position error signal is generated from the A burst and B burst to control the positioning of the write head during writing operations. Typically the write head and the read head are not positioned over the same track, but are offset by several data tracks.

SUMMARY OF THE INVENTION

The inventors find that these servo offset burst patterns may be squeezed, creating what is referred to herein as squeezed tracks. These squeezed tracks result from imperfections in the servo write process, particularly when the track pitch is very small. The inventors have found that writing when positioning using a squeezed read track and guided by the A-B position error signal may lead to damaging a neighboring data track.

An embodiment of the invention includes a hard disk drive that disables writing a write track when a position error signal based upon all four servo offset burst patterns (A, B, C, and D) is above a position error threshold, rather than based upon just two of the burst patterns. Such hard disk drives have an advantage over the hard disk drives of the prior art, in that they will not write tracks when the positioning is adversely affected using this position error signal read from a squeezed read track. Three embodiments of the position error signal based upon all four servo offset bursts are disclosed and claimed.

Other embodiments of the invention include a preamplifier generating the position error signal based upon all of the servo offset bursts when a write track is to be written and a method for writing a write track including creating and using an embodiment of the position error signal to suppress the writing of the write track when the read track is squeezed.

BRIEF DESCRIPTION OF THE DRAWINGS

FIG. 10 shows a disk of FIGS. 1 and 2 with one or both of its disk surfaces being used for data access and with at least one of these disk surfaces being organized into at least two regions of tracks with potentially different track density;

DETAILED DESCRIPTION

An embodiment of the invention includes a hard disk drive that disables writing a write track when a position error signal based upon all four servo offset burst patterns is above a position error threshold. A servo offset burst pattern is typically recorded as four offset bursts (referred to herein as A burst, B burst, C burst, and D burst) written across the background of a rotating disk surface. Embodiments of the invention also include a preamplifier generating the position error signal from the four servo offset bursts when a write track is to be written. Previously writing was disabled based upon the difference of only two of the four servo offset burst patterns. In embodiments of the present invention, all four servo offset burst patterns are used for positioning rather than just two when data is to be written.

Figure 1:
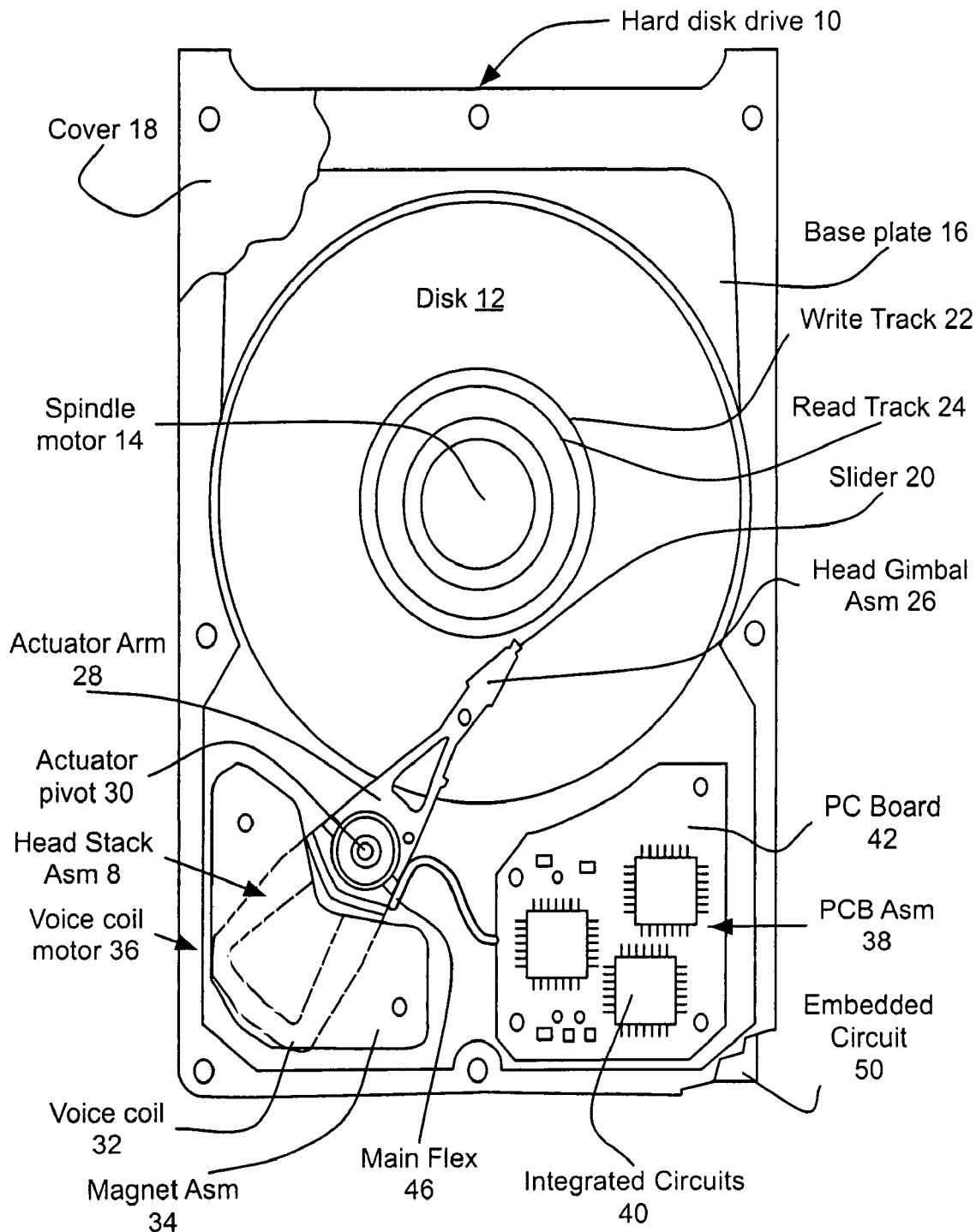
FIG. 1 shows an embodiment of a hard disk drive writing a write track while fine positioning is directed by the four servo burst patterns of the read track.

Referring to the drawings more particularly by reference numbers, FIG. 1 shows an example embodiment of a hard disk drive 10 of the present invention. The hard disk drive may include one or more magnetic disks 12 rotated by a spindle motor 14. The spindle motor may be mounted to a base plate 16. The hard disk drive may further have a cover 18 that encloses the disks 12.

The hard disk drive 10 may include one or more sliders 20 located adjacent to the surfaces of the disks 12. Each slider may have a separate write head (not shown) and read head (not shown). Each slider 20 is gimbal mounted in a head gimbal assembly 26. Each head gimbal assembly is attached to an actuator arm 28, which is part of the head stack assembly 8 that is pivotably mounted to the base plate 16 by an actuator pivot 30. The head stack assembly includes a voice coil 32 attached to the actuator arm. The voice coil is coupled to a magnetic assembly 34 to create the voice coil motor 36. Providing a position control as a time varying electric signal to the voice coil creates a torque on the head stack assembly swinging the actuator arm and moving the sliders across the disks.

Figure 2:
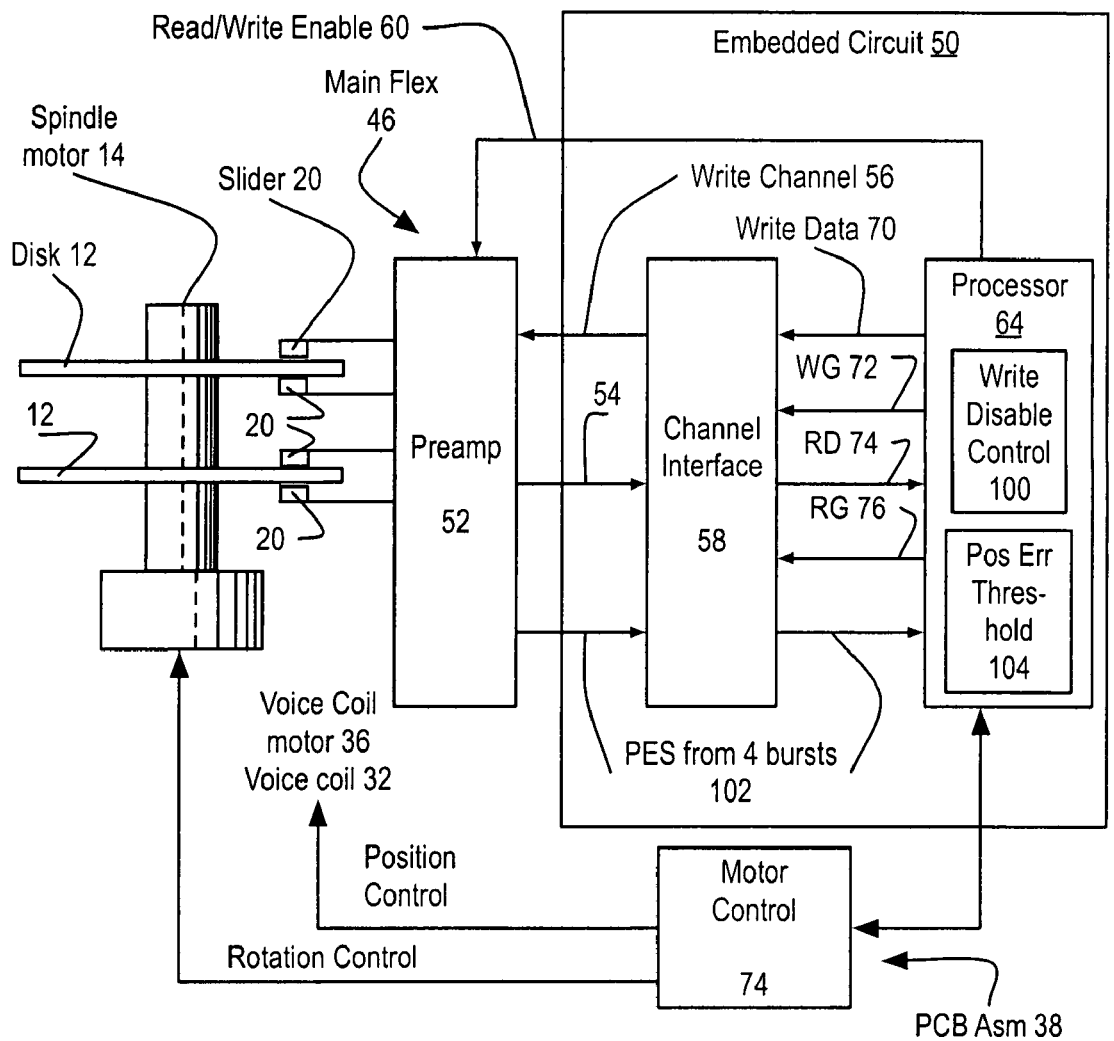
FIG. 2 shows in a schematic fashion some further details of FIG. 1 including a preamplifier generating a position error signal (PES) from all four servo offset bursts that is used by a processor in the embedded circuit to disable writing of the write track when the read track is squeezed.

A processor 64 in the embedded circuit 50 typically controls the operation of the hard disk drive 10 as shown in the schematic of FIG. 2. To access the write track 22 on the surface of the disk 12 the processor alters the position control signal generated by the motor control circuit 74, which stimulates the voice coil 32. The voice coil motor 36 responds by altering the torque acting on the head stack assembly 8. This pivots the head stack assembly about the actuator pivot 30 moving the actuator arm 28, and through the coupled head gimbal assembly 26, moving the slider 22 over the disk until the write head is near the write track 22 and the read head is near the read track 24. At this point, the hard disk drive enters into an operational mode referred to as track following and may preferably use a method of this invention when writing the write track 22.

An embodiment of the invention includes the hard disk drive 10 using the position error signal generated form all four bursts (hereafter referenced as PES from four bursts 102 when the read head uses a read track 24 which is squeezed, to disable the writing of the write track 22. Such hard disk drives have an advantage over the hard disk drives of the prior art, in that they will not write tracks when the positioning is adversely affected by reading a squeezed read track 24 as shown in FIG. 3.

The hard disk drive 10 may preferably include a main flex circuit 46 electrically coupling between the sliders 20 and the embedded circuit 50 as shown in FIG. 2. The main flex circuit often provides feedback to the embedded circuit through a channel interface 58. The preamplifier preferably uses the read data channel 54 to create the PES from four bursts 102 presented to the channel interface 58 when a read-write enable signal 60 indicates a write operation.

When the read-write enable signal 60 indicates a write operation and the hard disk drive 10 is in track following mode, the read head within the slider 20 is positioned near the read track 24 while the write head is positioned near the write track 22. An embodiment of the preamplifier 52 provides position error signal known herein as the PES from four bursts 102 to the channel interface 58, which in turn passes it to the processor 64, where a write disable control 100 may preferably suppress the write operation when the PES from four bursts 102 falls outside of a preferred range. A position error threshold 104 may be used to assert the write disable control 100.

Figure 3:
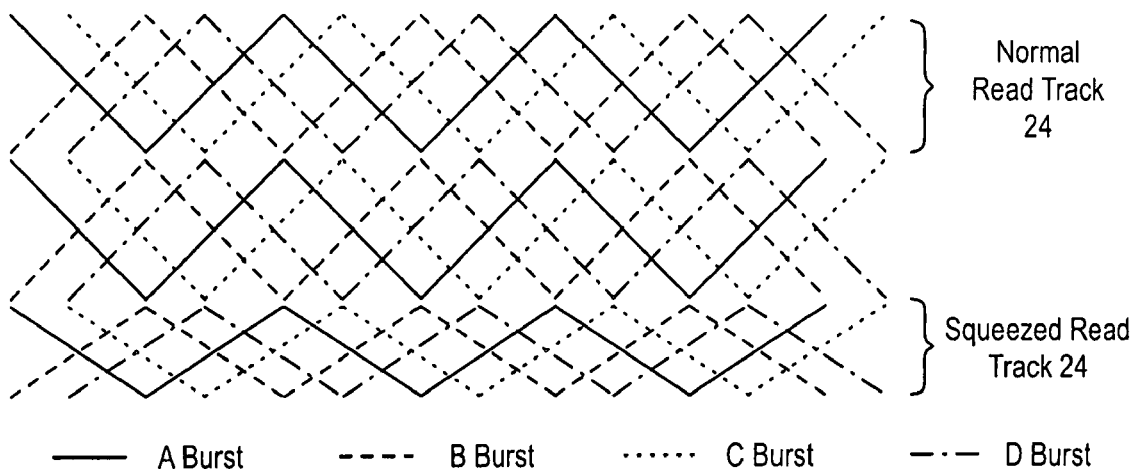
FIG. 3 provides an illustrative example of a normal read track and a squeezed read track used for positioning during the data write operation.
Figure 4A:
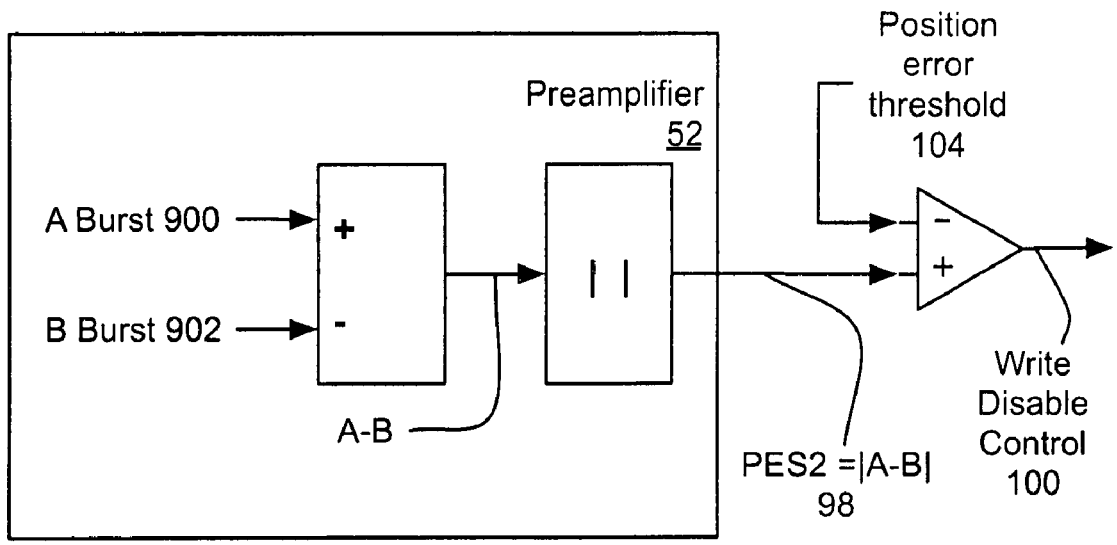
FIG. 4A shows a schematic of a prior art preamplifier generating a position error signal based upon two of the servo burst patterns read from the read track for positioning the writing of the write track.

As previously mentioned, in the hard disk drive 10 a servo write pattern is typically recorded as four servo offset bursts known as the A burst, B burst, C burst, and D burst and shown in FIG. 3. The prior art typically uses a PES from two bursts 98 based upon two of these four bursts to determine when the write head is improperly positioned as shown in FIG. 4A. The signals derived from the slider 20 reading these servo offset bursts from the read track 24 are denoted in the Figures as the A burst 900, the B burst 902, the C burst 904 and the D burst 906. The prior art often uses the absolute value of A-B burst readings to generate the PES from two bursts 98, mathematically denoted as $PES_2$ and expressed as:

$$PES_2 = |A-B| \quad (1)$$

While this prior art approach has been effective, the track pitch is now very small, often less than ten nanometers, and imperfections in the servo write process may result in "squeezed" read tracks 24 as shown in FIG. 3. The inventors recognized that writing data based upon the PES from two bursts 98 of a squeezed read track 24 could inaccurately position the write head and damage a neighboring data track to the write track 22.

Figure 4B:
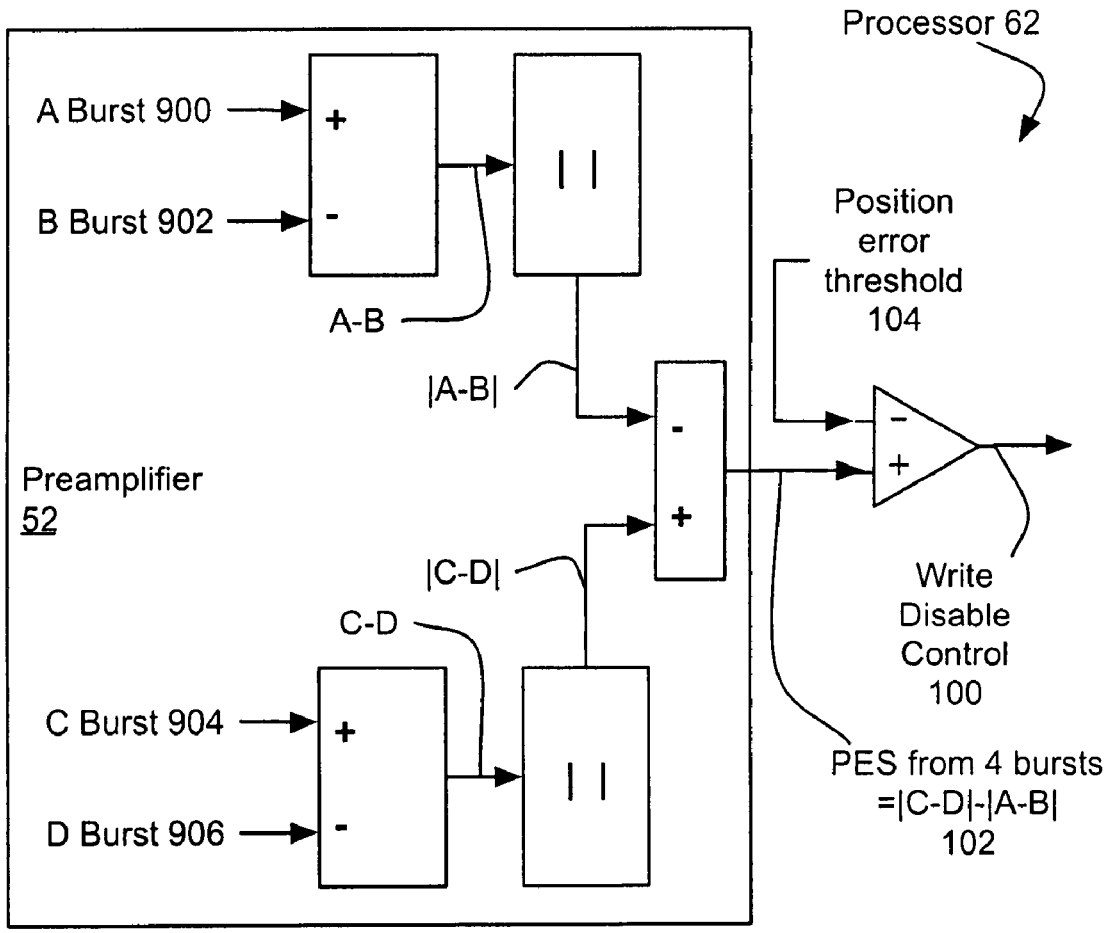
FIG. 4B shows a schematic of an embodiment of the preamplifier generating a position error signal from the four servo offset bursts read from the read track to control the writing of the write track.

Embodiments of the invention include the preamplifier 52 generating a position error signal for the write process based upon all four of the servo offset bursts as shown in FIGS. 2, 4B, 8 and 9. One embodiment of the PES from four bursts 102 is shown in FIG. 4B, mathematically denoted as $PES_4$ and formulated as:

$$PES_4 = |A-B| - |C-D| \quad (2)$$

While there are two other embodiments of the position error signal that will be discussed and claimed, for the moment we will focus on this embodiment of the PES from four bursts 102 that has been tested in the inventors' laboratory.

A write disable control 100 based upon the PES from four bursts 102 may preferably be used to suppress the writing of the write track 22 when the read track 24 is a squeezed track. The write disable control may result from comparing the PES from four bursts with a position error threshold 104. The position error threshold may be based upon the track density 106, which will be discussed later. When the PES from four bursts is above the position error threshold, the writing of the write track is suppressed.

Figure 5A:
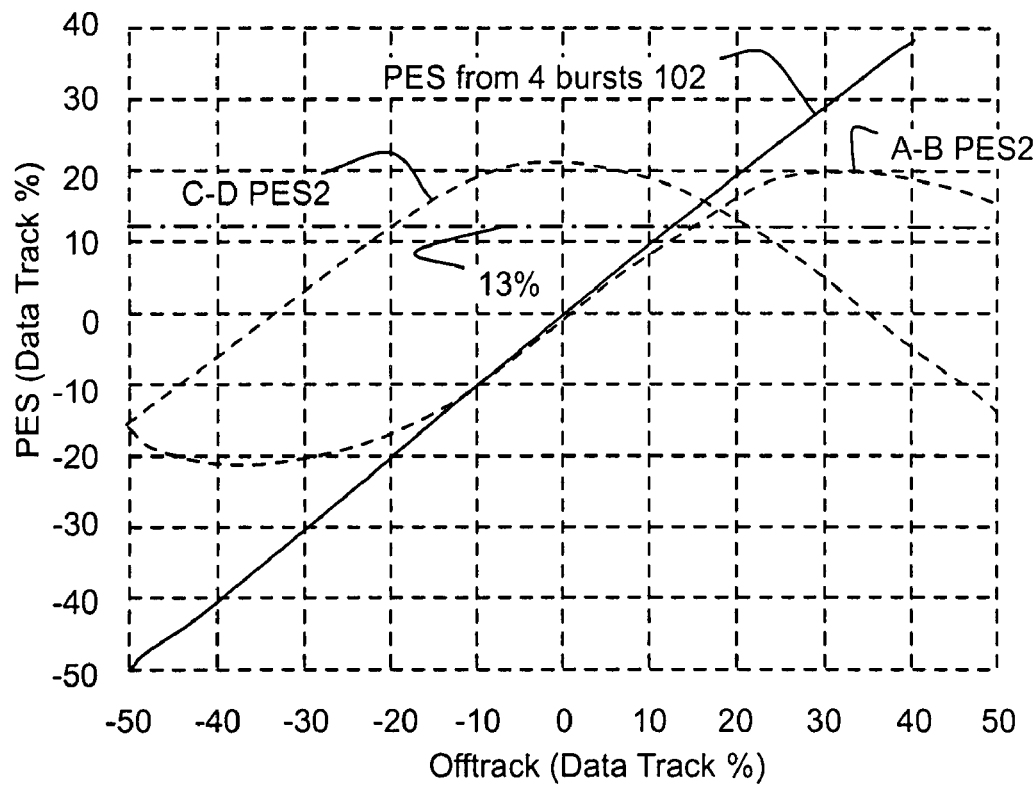
FIGS. 5A and 5B show summaries of experimental results of the prior art position error signals from two of the bursts, A-B and C-D, and one embodiment of the position error signal from the four bursts when the read track is a normal track in 5A and is a squeezed track in 5B.
Figure 5B:
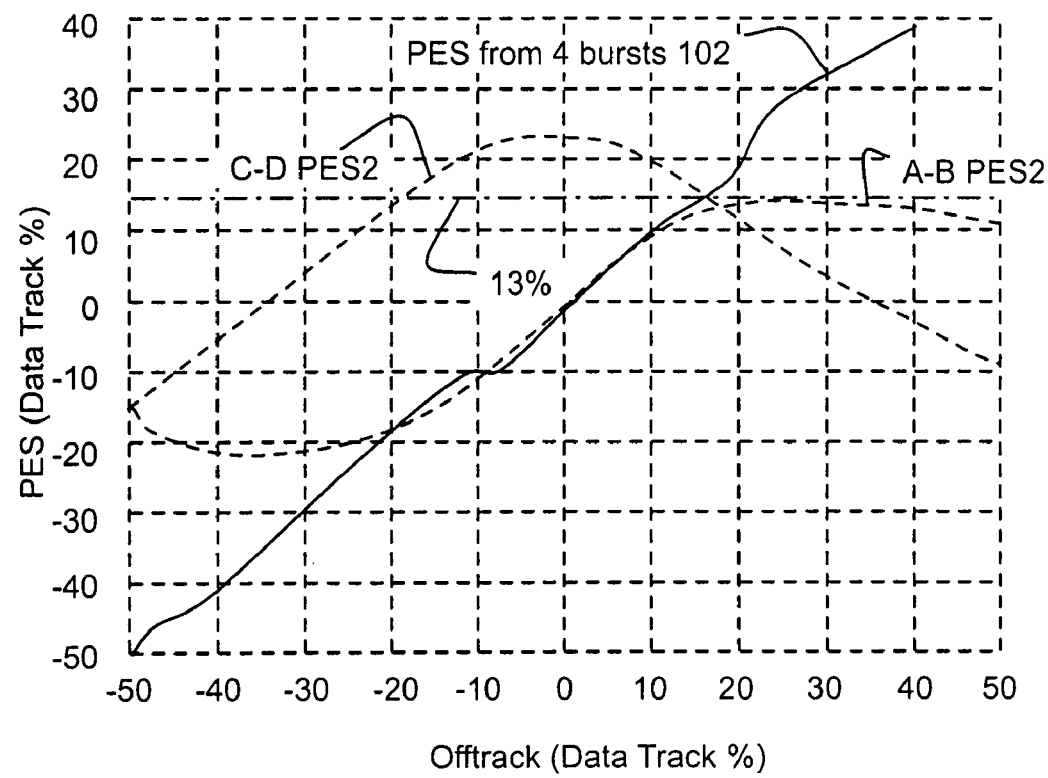
Figure 6:
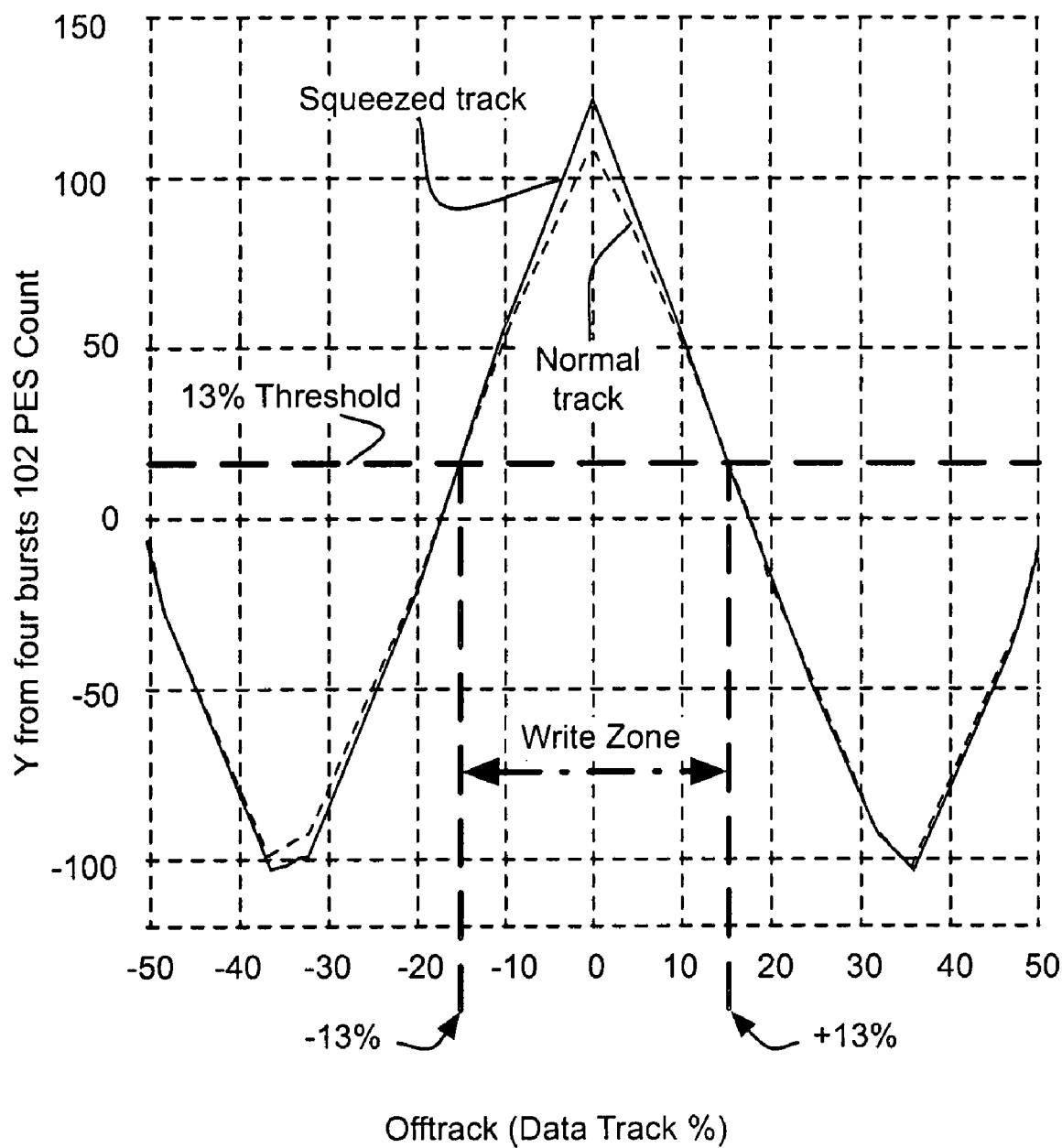
FIG. 6 shows a summary of these experimental results for both normal read tracks and squeezed read tracks.

FIG. 5A shows a comparison of experimental results of the PES from four bursts 102 compared to the A-B Position Error Signal (A-B PES2) and the C-D PES2 when the read head is positioned over a read track 24 that is a normal track. FIG. 5B shows the same comparison when the read track is a squeezed track. FIG. 6 compares this position error signal for read tracks that are normal tracks and for read tracks that are squeezed tracks when positioning for writing a write track 22. The inventors were surprised to find that the PES from four bursts 102 showed good linearity up to 20% off track and could readily detect 13% off track with high accuracy, whereas FIG. 5B shows that the A-B PES curve showed linearity only up to 12% for a squeezed read track.

Figure 7:
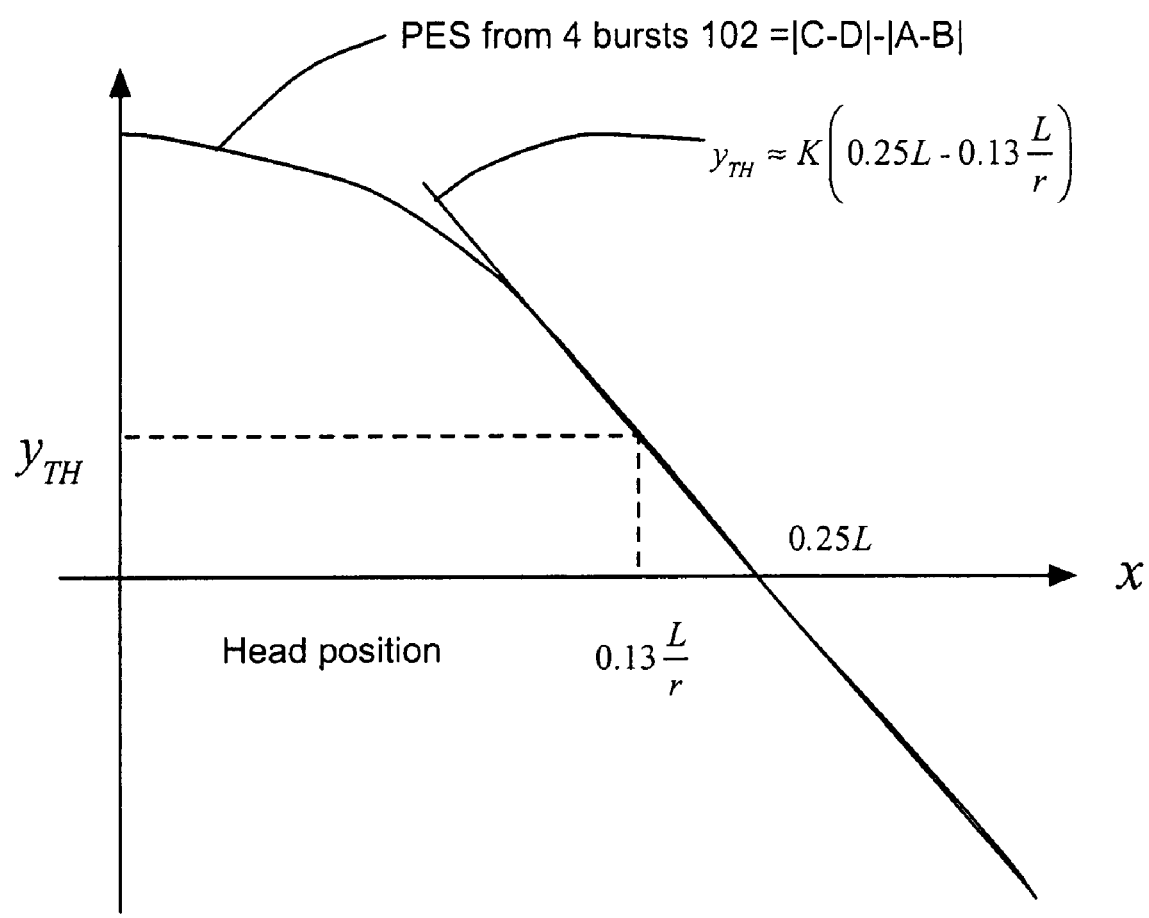
FIG. 7 shows one way to calculate a position error threshold, which is used to disable writing the write track as shown in FIG. 4B.

One way to determine the position error threshold 104 is to plot the writing of a write track 22 is shown in FIG. 7. The position error threshold is denoted mathematically as $Y_{TH}$ and may be straight line approximated using $$y = K(0.25L - x) \quad (3)$$

Where L is the servo track pitch and K is a constant determined by an off-line calibration process. The variable x is based upon the head position. The 13% of the data track threshold can be determined by setting x=0.13 L/r, where r is the data track pitch. This makes equation (3) into the following:

$$Y_{TH}=K(0.25L-0.13L/r) \quad (4)$$

Figure 9:
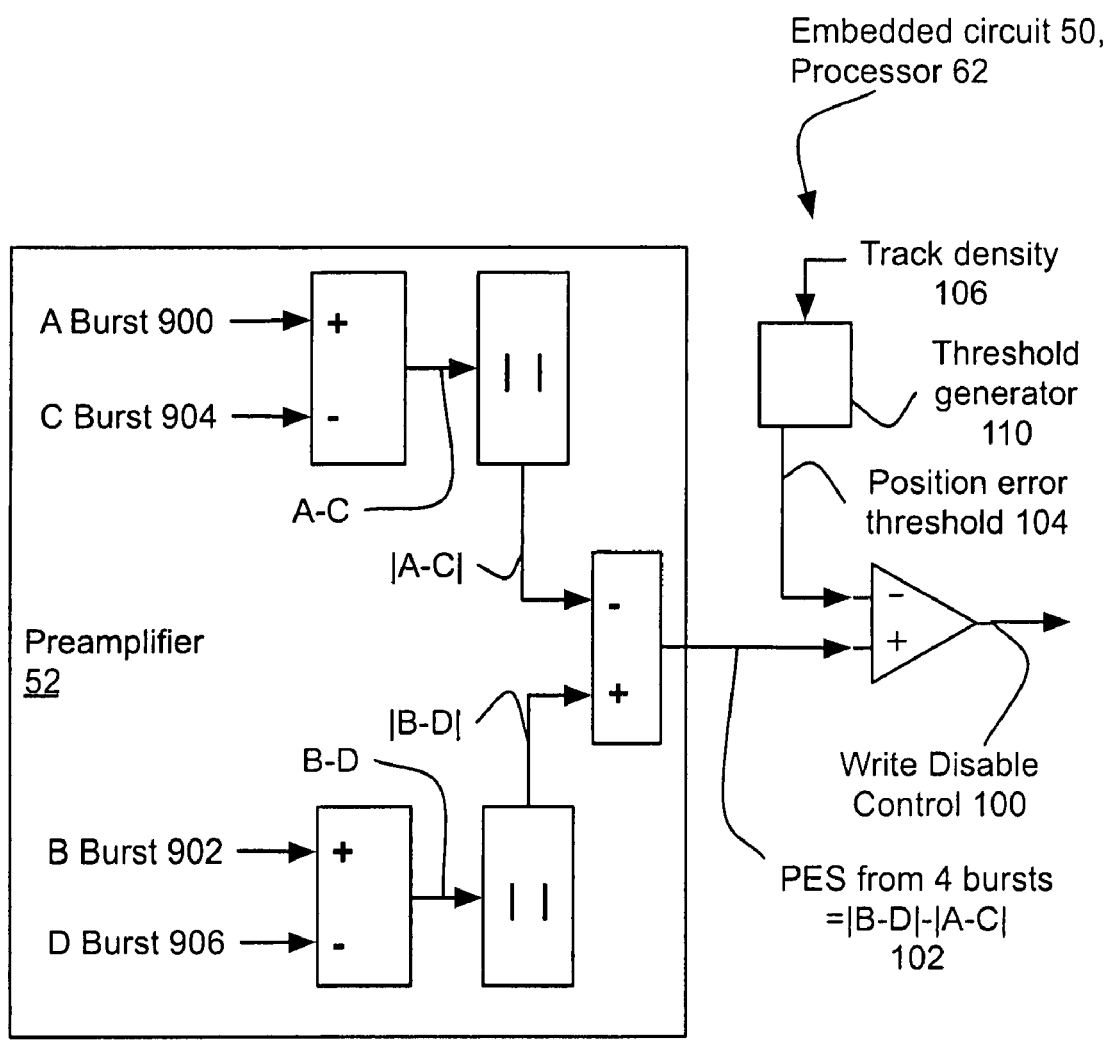
FIG. 9 shows a schematic of another alternative embodiment of the preamplifier generating another position error signal from the four servo offset bursts and also shows the embedded circuit and preferably the processor using a threshold generator presented a track density to generate the position error threshold used to disable the write process.

The track density 106 is the reciprocal of the data track pitch, or 1/r. The track density may preferably be represented in terms of tracks per inch. Referring to FIGS. 9 and 11B, in certain embodiments of the invention, a threshold generator 110 may use equation (4) to implement calculating the position error threshold 104 from the track density.

Figure 8:
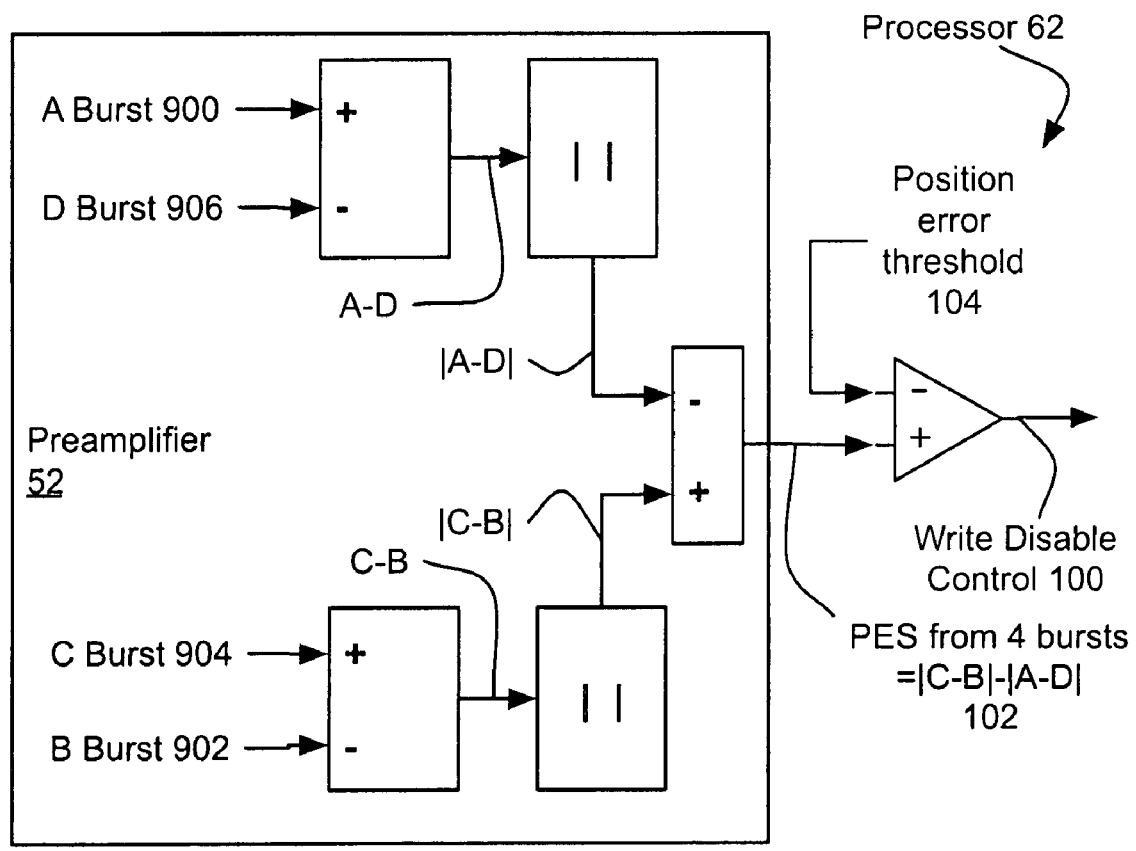
FIG. 8 shows a schematic of an alternative embodiment of the preamplifier generating an alternative position error signal from the four servo offset bursts.

An alternative embodiment of the preamplifier 52 generating an alternative embodiment of the PES from four bursts 102 is shown in FIG. 8 and may be mathematically formulated as:

$$PES_4=|A-D|-|C-B| \quad (5)$$

Another alternative embodiment of the preamplifier 52 generating another embodiment of the PES from four bursts 102 is shown in FIG. 9 and may be mathematically formulated as:

$$PES_4=|A-C|-|B-D| \quad (6)$$

In further detail, the disk 12 may use one disk surface 120 and/or may use a second disk surface 122 for data storage, as shown in FIG. 10. Either or both of these disk surfaces may be organized into regions having differing track density. Different disk surfaces may have different numbers of regions. The regions may vary in size, location and track density on differing disk surfaces.

For example, the second disk surface 122 may have a first region 140 with a first track density 150 and a second region 142 with a second track density 152. The first track density may differ from the second.

Another aspect of the invention includes the manufacture of the preamplifier and the hard disk drive, as well as these items as products of these manufacturing processes.

Figure 11A:
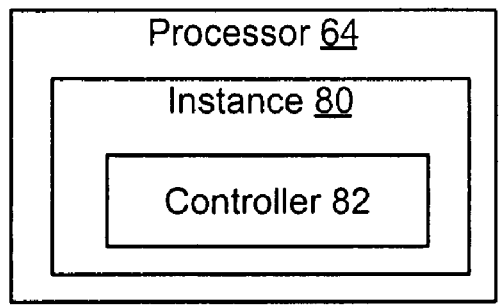
FIG. 11A shows a schematic of the processor of the preceding Figures including at least one instance of a controller.
Figure 11B:
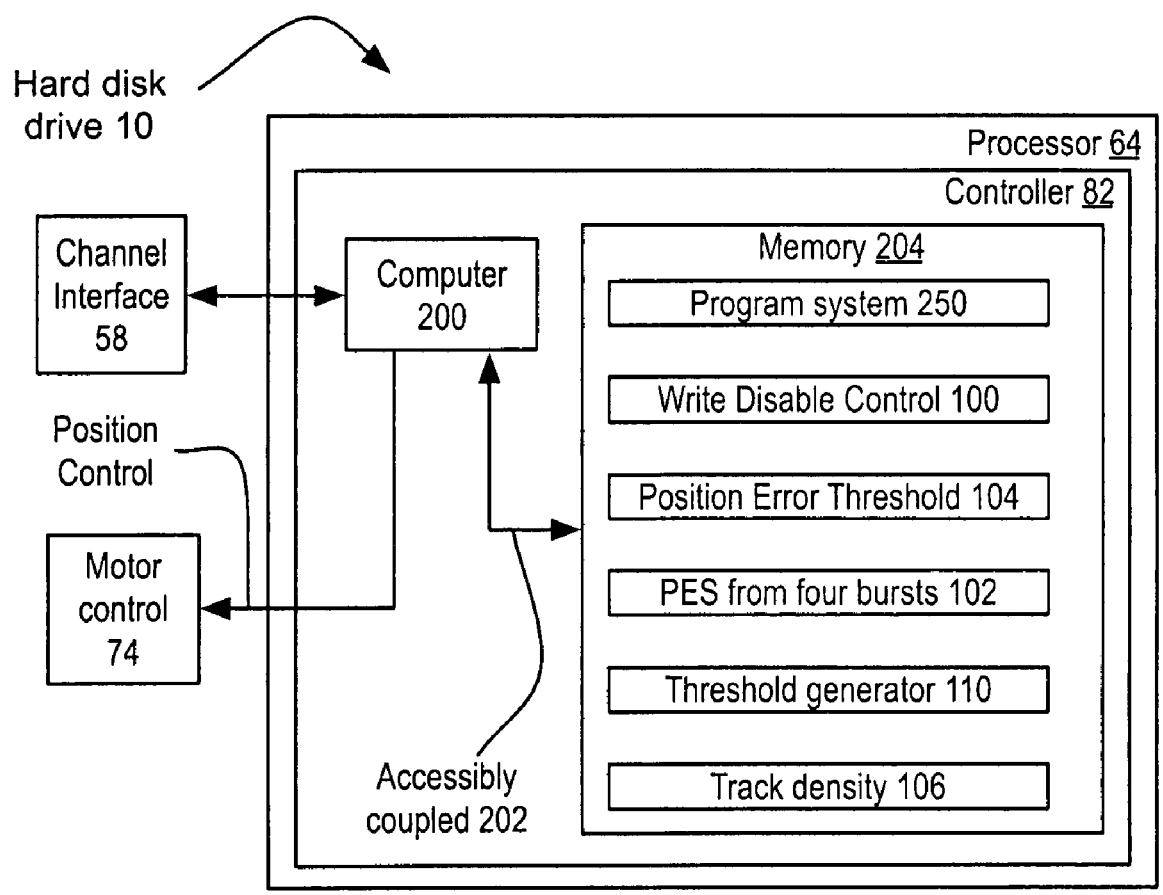
FIG. 11B shows a schematic of the processor of FIG. 11A with the controller including a computer accessibly coupled by a buss to a memory and at least partly directed by a program system to disable writing the write track based upon the position error signal from the four servo offset bursts, which may generate the position error threshold using an embodiment of the threshold generator and the track density.

FIG. 11A shows the processor 64 of the preceding Figures including at least one instance 80 of a controller 82. The controller may receive at least one input, maintain and update the value of at least one state and generate at least one output based upon at least one of the inputs and the value of at one of the states. A controller may include at least one finite state machine and/or at least one inference engine and/or a neural network.

FIG. 11B shows the processor 64 and the controller 82 including a computer 200 accessibly coupled 202 by a buss to a memory 204 and at least partly directed by a program system 250 to disable writing the write track 22 based upon using the PES from four bursts 102, which may further include comparing the PES from four bursts with the position error threshold 104 to disable the writing of the write track 22 when the read track 24 is squeezed. The position error threshold may be generated by the threshold generator 110 and the track density 106 of the region 140 of the disk surface 120 being accessed. The threshold generator may be embodied as a table and/or at least one program step of the program system. As used herein, a computer includes at least one data processor and at least one instruction processor, where each of the data processors are at least partly directed by at least one of the instruction processors.

The preceding embodiments provide examples of the invention and are not meant to constrain the scope of the following claims.

What is claimed is:

1. A hard disk drive, comprising:
   a disk with a write track and a read track;
   a slider accessing said disk to write said write track and read said read track to sense four servo offset bursts as a positioning information, said four servo offset bursts consisting of an A burst, a B burst, a C burst, and a D burst;
   a preamplifier receiving said positioning information for creating a position error signal using all of said four servo offset bursts; and
   an embedded circuit receiving said position error signal to stop writing said write track when said position error signal exceeds a position error threshold comprises a processor for comparing said position error signal to said position error threshold to at least partly generate a write disable control and further generates said position error threshold based at least partly upon a track density of said write track.

2. The hard disk drive of claim 1, wherein said position error signal uses the difference of said A burst and said B burst and the difference of said C burst and said D burst.

3. The hard disk drive of claim 1, wherein said position error signal uses the difference of said A burst and said D burst and the difference of said C burst and said B burst.

4. The hard disk drive of claim 1, wherein said position error signal uses the difference of said A burst and said C burst and the difference of said B burst and said D burst.

5. The hard disk drive of claim 1, wherein said processor further includes a threshold generator receiving said track density to generate said position error threshold.

6. The hard disk drive of claim 1, wherein said disk includes at least a first region and a second region wherein said first region and second region may have different track densities.

7. The hard disk drive of claim 1, wherein said preamplifier comprising a means for generating a said position error signal based upon said four servo offset bursts sensed by said slider when said slider is to write a said write track.

8. A method of operating a hard disk drive, comprising the steps of:
   creating a position error signal using all of four servo offset bursts read from a read track when said write track is to be written, wherein said four servo offset bursts consist of an A burst, a B burst, a C burst, and a D burst;
   using said position error signal to disable said writing of said write track when said position error signal exceeds a position error threshold; and
   generating said position error threshold based upon a track density of said track.

9. The method of claim 8, wherein said position error signal uses the difference of said A burst and said B burst and the difference of said C burst and said D burst.

10. The method of claim 8, wherein said position error signal uses the difference of said A burst and said D burst and the difference of said C burst and said B burst.

11. The method of claim 8, wherein said position error signal uses the difference of said A burst and said C burst and the difference of said B burst and said D burst.

* * * * *